Oct. 20, 1964
S. R. McCUTCHEON
3,153,734
COMPARATOR CIRCUITS FOR DETERMINING WHEN A NUMBER IS
GREATER THAN A PREDETERMINED NUMBER
Filed June 18, 1962
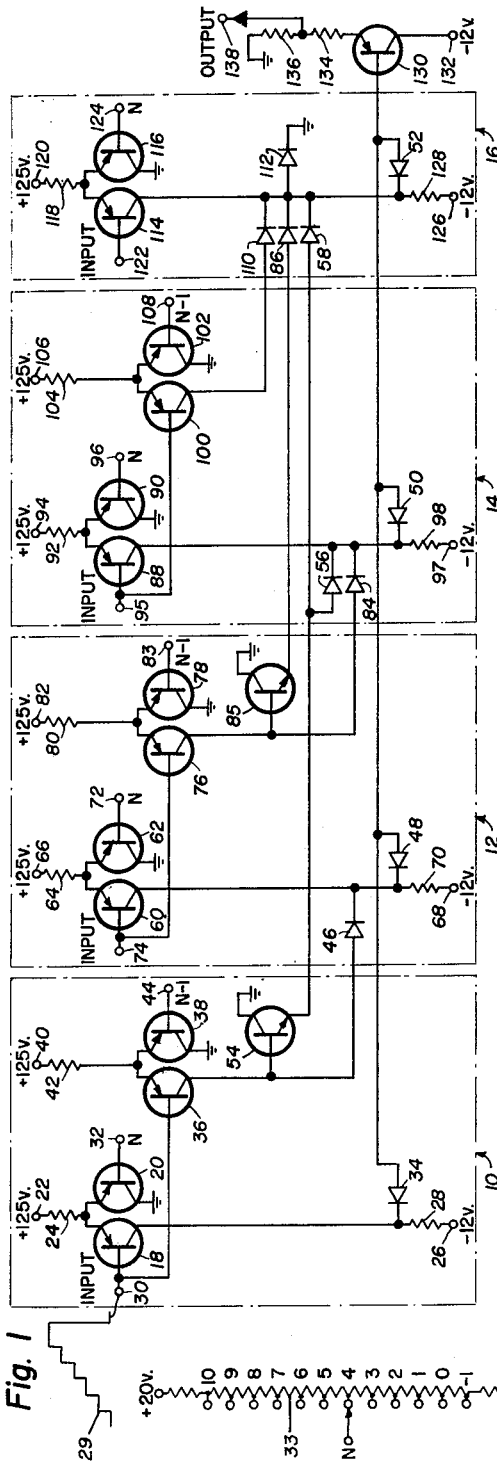
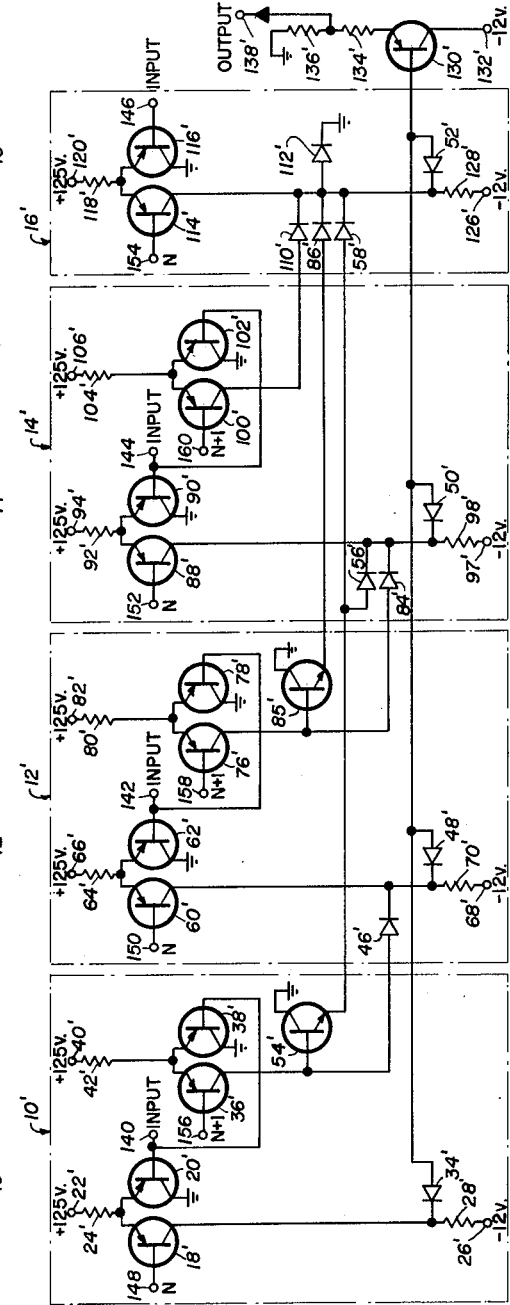
INVENTOR.
SAMUEL R. McCUTCHEON
BY
BUCKHORN, CHEATHAM & BLORE
ATTORNEYS

United States Patent Office 3,153,734
Patented Oct. 20, 1964

3,153,734
COMPARATOR CIRCUITS FOR DETERMINING WHEN A NUMBER IS GREATER THAN A PREDETERMINED NUMBER
Samuel R. McCutcheon, Aloha, Oreg., assignor to Tektronix, Inc., Beaverton, Oreg., a corporation of Oregon
Filed June 18, 1962, Ser. No. 203,385
9 Claims. (Cl. 307—88.5)

The present invention relates generally to electrical signal comparator circuits and specifically to no-go circuits for determining when the number of pulses counted by a pulse counter circuit is greater or less than a predetermined limit set in such no-go circuit.

The no-go comparator circuits of the present invention are particularly useful in determining when the number of pulses counted in a binary decimal counter, such as that shown in U.S. patent application Serial No. 133,-813, filed August 25, 1961, by John R. Kobbe and Samuel R. McCutcheon, entitled Pulse Counter, exceeds a first predetermined upper limit number which is set in one of the no-go circuits, or is less than a second predetermined lower limit number which is set in a second no-go circuit or is between the upper limit and lower limit numbers. When the number of pulses counted exceeds the upper limit or is less than the lower limit, a "no-go" condition prevails which may be indicated by signal lights connected to the output of the upper limit and lower limit no-go comparator circuits. However, when such number of pulses lies between the lower limit and the upper limit, the comparator circuits indicate a "go" condition. The no-go comparator circuits may be employed to determine whether the number of samples taken in a sampling type of cathode ray oscilloscope to produce a selected portion of the repetitive signal waveform under analysis, is above below or between preselected upper and lower limits.

One advantage of the no-go comparator circuits of the present invention is the sequential operation of such circuit in which each stage of the comparator circuit operates consecutively to provide a "go" or "no-go" condition answer with the greatest possible speed. This no-go circuit has the added advantage that it utilizes each stage of the circuit most efficiently, since only those stages which are necessary to produce a no-go output signal are operated. Another advantage of the present no-go signal comparator circuit is its simplicity of construction and reliability of operation. In addition, the no-go circuits may have their outputs connected to signal lights which give a visual indication of the circuits' condition for fast and simplified control of manufacturing process, such as in the production of semiconductor devices.

Briefly, one embodiment of the no-go signal comparator circuit of the present invention includes a first stage connected to a plurality of intermediate stages similar to first stage and a last stage which is connected to all of the preceding stages. The first stage includes a first pair of signal comparator transistors for comparing a first input signal from the first digit stage of a pulse counter with a first digit limit reference voltage to obtain a first output signal, a first gating diode connected to the output of one of the first signal comparator transistors in order to transmit such first output signal when it is of a predetermined polarity, and a first pair of enabling comparator transistors connected from the input of such first signal comparator transistors to the outputs of following stages for comparing the first input signal with a second reference voltage differing from such first digit reference voltage by a predetermined voltage which corresponds to one first digit number, in order to obtain a first enabling pulse. The plurality of intermediate stages are similar to the first stage and are connected in succession to such first stage and to each other so that the input signals for each of such intermediate stages comes from a different digit stage of the counter and their digit limit reference voltages correspond to the digit number limits for such different counter stage. The gating diode of each successive stage of such intermediate stages is connected to the outputs of the enabling comparator transistors of all previous stages so that the enabling signals of all of such previous stages must be applied to this gating diode before it is in condition to transmit the output signal of the intermediate stage with which it is associated. The last stage includes a last pair of comparator transistors for comparing a last input signal from the last digit stage of the counter with a last digit limit reference voltage to obtain a last output signal, and a last gating diode connected to the output of such last comparator transistors and to the outputs of all of the enabling comparator transistors of the first stage and the intermediate stages so that all of their enabling signals must be applied to such last gating diode before it is in condition to transmit the final output signal through such last gating diode. An output switching transistor is connected in common with all of the gating diodes of the first, intermediate and last stages of the no-go signal comparator circuit so that the current conducting condition of such switching transistor changes when any of the output signals of such stages is transmitted to such switching transistor through any of the gating diodes, in order to indicate by consecutive operation of such gating diodes whether the number of pulses counted by the pulse counter is greater or less than the limit number set by the digit limit reference voltages of such stages.

It is therefore one object of the present invention to provide an improved electrical signal comparator circuit.

Another object of the invention is to provide an improved signal comparator circuit having a plurality of different stages connected so that they operate consecutively.

A further object of the present invention is to an improved no-go signal comparator circuit in which a plurality of different stages are operated consecutively to obtain an output signal with rapidity and accuracy.

Still another object of the invention is to provide an improved no-go signal comparator circuit in which a plurality of different stages corresponding to the different digit stages in a pulse counter are employed for determining whether the number of pulses counted in such pulse counter is above or below a limit set in such comparator circuit with great speed and accuracy.

A still further object of the invention is to provide an improved signal comparator circuit which is simple in construction and fast and reliable in operation.

An additional object of the present invention is to provide improved lower limit and upper limit no-go signal comparator circuits each employing a plurality of different stages which operate consecutively to determine whether the number of sampling pulses from a sampling oscilloscope and counted in a digital pulse counter circuit is greater than an upper limit number, or is less than a lower limit number, or is between the two limit numbers in a fast and accurate manner.

Other objects and advantages of the present invention will be apparent from the following detailed description of the preferred embodiments thereof and to the attached drawings of which:

FIG. 1 is a schematic diagram of the upper limit no-go signal comparator circuit of the present invention;

FIG. 2 is a schematic diagram of the lower limit no-go signal comparator circuit of the present invention; and FIG. 3 is a schematic diagram of a suitable input circuit for supplying reference voltages to each of the reference voltage terminals of FIGS. 1 and 2.

The embodiment of the no-go signal comparator circuit of the present invention shown in FIG. 1 is an upper limit no-go circuit which includes four separate stages 10, 12, 14 and 16, which correspond to the thousands, hundreds, tens and units digits of the total number of pulses counted in a four-stage digital pulse counter (not shown). The thousands stage 10 has a signal comparator circuit including a first PNP type comparator transistor 18 having its emitter connected to the emitter of a second PNP type comparator transistor 20 and to a source of positive D.C. bias voltage 22 through a common emitter resistor 24. The collector of the first comparator transistor 18 is connected to a source of negative D.C. bias voltage 26 through a load resistor 28 while the collector of the second comparator transistor 20 is connected to ground. A first stairstep input signal 29 from the thousands digit stage of the pulse counter is connected to the base of the first comparator transistor at input terminal 30, while the base of the second comparator transistor 20 is connected to a source of positive D.C. upper limit reference voltage (N) at input terminal 32.

As shown in FIG. 3, this reference voltage (N) may be provided by a stepped resistance potentiometer 33 which is connected between two sources of positive and negative D.C. voltages, respectively, and has a movable contact connected to the input terminal 32. A similar potentiometer may be provided for each reference voltage input terminal or the same one can be used with appropriate switching. The voltage of the upper limit reference voltage applied to input terminal 32 is manually set by potentiometer 33 and corresponds to the thousands digit (N) of the total number of pulses counted in the pulse counter circuit. The input signal from the thousands stage of such pulse counter applied to the input terminal 30, is in the form of positive stairstep voltage 29 having a plurality of equal stairsteps with the voltage amplitude of each stairstep corresponding to one decimal number of the thousands digit portion of the total number of pulses counted by such counter. Thus, the number of stairsteps of such input signal represents the number of pulses counted for that digit so that, for example, six stairsteps in the first input signal means the number of pulses is between 6000 and 6999. A similar stairstep voltage is produced in each one of a thousands counter stage, a hundreds counter stage, a tens counter stage and a units counter stage circuit of the counter circuit and is applied to one of the input terminals of the no-go comparator circuit stages 10, 12, 14 and 16, respectively. It should be noted that the potentiometer 33 is provided with resistance steps from −1 to +10, rather than from 0 to 9, because the reference voltage can be $N-1$, N, or $N+1$ in the circuits of FIGS. 1 and 2 and reference voltage numbers corresponding to $N-1$ and $N+1$ are −1 and +10 respectively, when the limit number is 0 and 9, respectively.

In addition to the signal comparator circuit including transistors 18 and 20, the thousands stage also includes a gating diode 34 whose cathode is connected to the common connection of load resistor 28 and the collector of transistor 18. This gating diode is normally reversed biased in the upper limit no-go circuit because the positive D.C. reference voltage (N) makes transistor 20 normally nonconducting and transistor 18 normally conducting to place its collector and the cathode of diode 34 at a positive D.C. voltage. The thousands stage 10 also includes an enabling comparator circuit including a third PNP type comparator transistor 36 whose emitter is connected to the emitter of a fourth PNP type comparator transistor 38 and to a source of positive D.C. bias voltage 40 through a common emitter resistor 42. The base of the third comparator transistor 36 is connected to the input terminal 30 while the base of the fourth comparator transistor 36 is connected to a source of positive D.C. enabling reference voltage ($N-1$) at an input terminal 44. The amplitude of the enabling reference voltage connected to input terminal 44 by a potentiometer similar to that shown in FIG. 3, is less than that of the upper limit reference voltage (N) connected in input terminal 32 by a voltage which corresponds to one decimal number of the thousands digit input signal from the pulse counter, as represented by the term $N-1$. The collector of the fourth comparator transistor 38 is connected to ground while the collector of the third comparator transistor 36 is connected to the hundreds stage 12 through a coupling diode 46, whose cathode is connected to the cathode of a second gating diode 48, to transmit an enabling signal from the enabling comparator circuit of the thousands stage to the gating diode 48 of the hundreds stage. In addition, this enabling signal is also transmitted to third and fourth gating diodes 50 and 52 of the tens stage 14 and units stage 16, respectively, through an NPN type switching transistor 54. The base of this switching transistor is connected to the collector of third comparator transistor 36, while its collector is grounded and its emitter is connected through a coupling diode 56 to the gating diode 50 and through a coupling diode 58 to the gating diode 52. The voltage on the collector of transistor 36 is normally positive due to the fact that the enabling comparator transistor is normally conducting, allowing current to flow through coupling diode 46 from source 40 to reverse bias gating diode 48, and to render switching transistor 54 normally conducting so that current also flows through coupling diodes 56 and 58 to reverse bias gating diodes 50 and 52.

The hundreds stage 12 of the no-go comparator circuit of FIG. 1 is similar to the thousands stage 10 so it will only be described briefly. This hundreds stage has a first signal comparator circuit including a first comparator transistor 60 and a second comparator transistor 62 with the emitters of such comparator transistors connected together at one end of a common emitter resistor 64 and connected through such resistor to a source of D.C. bias voltage 66. The collector of the second comparator transistor 62 is connected to ground and the collector of the first comparator transistor 60 is connected to a source of negative D.C. bias voltage 68 through a load resistor 70. A positive D.C. reference voltage (N) corresponding to the hundreds digit of the upper limit number is connected to the base of the second comparator transistor 62 at an input terminal 72, while a positive stairstep input signal from the hundreds stage of the pulse counter circuit is applied to the base of the first comparator transistor 60 at input terminal 74. The gating diode 48 for the hundreds stage is connected by its cathode between the load resistor 70 and the collector of the first comparator transistor 60 so that this gating diode is normally reverse biased by current flow through both the comparator transistor 60 and the coupling diode 46. Therefore, the enabling comparator transistor 36 must switch "off" to condition the gating diode 48 so that it will "open" and become conducting when comparator transistor 60 also switches "off," in order to transmit negative going output signal of the hundreds stage from the collector of the first comparator transistor 60 through such gating diode.

An enabling comparator circuit including a third PNP type comparator transistor 76 and a fourth PNP type camparator transistor 78 is also included in the hundreds stage. This enabling comparator is similar to that of the thousands stage in that the emitters of comparator transistors 76 and 78 are connected together at one end of a common emitter resistor 80 and are connected through such emitter resistor to a source of positive D.C. bias voltage 82. The collector of the fourth comparator transistor 78 is connected to ground, while the collector of the third comparator transistor 76 is connected to the gating diode 50 through a coupling diode 84 having its cathode connected to the cathode of the gating diode, for reverse biasing such gating diode by its enabling signal. The base of the third comparator transistor 76 is connected to the input signal from the hundreds counter stage at input terminal 74, while the base of the fourth comparator transistor 78 is connected to a source of positive D.C. reference voltage (N—1) which corresponds to a number of one less than the hundreds digit of the upper limit reference number. The enabling signal produced at the collector of the third comparator transistors 76 is also transmitted to the gating diode 52 in the units stage 16 through an NPN type switching transistor 85 and a coupling diode 86. The switching transistor 85 is connected at its base to the collector of transistor 76, at its emitter to the anode of coupling diode 86 and at its collector to ground.

The tens stage 14 and the units stage 16 of the no-go comparator circuit of FIG. 1 are also similar to the previously described thousands and hundreds stages except that the units stage is not provided with an enabling comparator circuit, so these stages will not be described in detail. Briefly, the tens stage includes a first PNP-type comparator transistor 88, a second PNP-type comparator transistor 90 having their emitters connected together at one end of a common emitter resistor 92 and through such resistor to a source of positive D.C. bias voltage 94. The base of comparator transistor 88 is connected to the input signal from the tens stage of the counter circuit at input terminal 95 and the base of the second comparator transistor 90 is connected at input terminal 96 to a positive D.C. reference voltage (N) corresponding to the tens digit of the upper limit number. The collector of transistor 88 is connected to a source of negative D.C. bias voltage 97 through a load resistor 98 so that the gating diode 50 is normally reverse biased by current flowing through the first comparator transistor 88, the coupling diode 56 and the coupling diode 84. Thus the enabling comparator transistors 36 and 76 must turn off before this gating diode 50 is in condition to transmit the negative going output signal of the tens stage from the collector of comparator transistor 88.

The tens stage also includes an enabling comparator circuit including a third comparator transistor 100 and a fourth comparator transistor 102 having their emitters connected in common at one end of a common emitter resistor 104 and connected through such resistor to a source of positive D.C. bias violtage 106. The base of the third comparator transistor 100 is connected to the input signal from the tens stage of the counter circuit at input terminal 95 while the base of the comparator transistor 102 is connected at input terminal 108 to a positive D.C. reference voltage (N—1) corresponding to a number one less than the tens digit of the upper limit number. The enabling signal generated by the enabling comparator transistor 100 is transmitted through a coupling diode 110 to the gating diode 52 in the units stage. In order to prevent too much reverse bias voltage from being applied to the cathode of the gating diode 52, a limiting diode 112 is connected at its anode to the cathodes of coupling diodes 58, 86 and 110, and at its cathode to ground.

The units stage 16 consists of a signal comparator circuit including a first comparator transistor 114 and a second comparator transistor 116 having their emitters connected to one end of a common emitter resistor 118 and through such resistor to a source of positive D.C. bias voltage 120. The base of the first comparator transistor 114 is connected at an input terminal 122 to the input signal from the units stage of the pulse counter circuit, while the base of the second comparator transistor 116 is connected to a positive D.C. reference voltage (N) corresponding to the units digit of the upper limit number. The collector of transistor 116 is grounded and the collector of transistor 114 is connected to a source of negative D.C. bias voltage 126 through a load resistor 128. The output signal of the units stage is transmitted from the collector of the comparator transistor 114 through a load resistor 128. The output signal of the units stage is transmitted from the collector of the comparator transistor 114 through the gating diode 52 connected at its cathode to such collector. Thus the gating diode 52 is normally reverse biased by current flowing through the first comparator transistor 114 and the coupling diodes 58, 86 and 110 so that such gating diode is conditioned to transmit an output signal only when all of the comparator transistors 36, 76 and 100 are turned "off" to transmit their negative going enabling signals to the cathode of gating diode 52 and remove the reverse bias on such gating diode. It should be noted that the coupling diodes serve the additional function of preventing any positive going output signal on the collectors of comparator transistors 60, 88 and 114 from reaching the collectors of the enabling transistors 36, 76 and 100, respectively.

The output signals which may be transmitted through the gating diodes 34, 48, 50 and 52 are applied to the base of an output switching transistor 130 which may be of the PNP type having its collector connected to a source of negative D.C. bias voltage 132 and its emitter connected to ground through a pair of voltage divider load resistors 134 and 136. This output switching transistor 130 is normally biased "off" or nonconducting and is only rendered conducting when one of the negative going output signals from the thousands stage 10, hundreds stage 12, tens stage 14 or units stage 16 is transmitted through their respective gating diodes 34, 48, 50 and 52. When this happens a negative going output signal is developed across the load resistors 134 and 136 and a portion of such negative going signal is transmitted to a signal lamp circuit (not shown) connected to the output terminal 138 between such load resistors.

The lower limit no-go comparator circuit of FIG. 2 is similar to upper limit no-go comparator circuit of FIG. 1 so that only the differences between the two circuits will be described with regard to such lower limit no-go circuit. Circuit components in FIG. 2 which are similar to circuit components of FIG. 1, have been provided with identical reference numbers. The major difference in the lower limit no-go circuit is that the input signal from the thousands, hundreds, tens and units stages of the pulse counter circuit are applied to the bases of comparator transistors 20', 62', 90' and 116', respectively, of the thousands, hundreds, tens and units stages of the no-go circuit at input terminals 140, 142, 144 and 146, respectively. Input terminals 140, 142 and 144 are also connected to the bases of comparator transistors 38', 78', and 102' of the second comparator circuits of the thousands, hundreds and tens stages, respectively. In addition the bases of comparator transistors 18', 60', 88' and 114' are connected to the positive D.C. reference voltages (N) corresponding to the thousands, hundreds, tens and units digits, respectively, of the lower limit reference number at input terminals 148, 150, 152 and 154, respectively. Also the bases of comparator transistors 36', 76', 100' are connected at input terminals 156, 158 and 160, respectively, to positive D.C. reference voltages (N+1) which correspond to a number one greater than the thousands, hundreds and tens digits, respectively, of the lower limit number. As the result of this connection, transistor 18' is normally nonconducting while comparator transistor 20' is normally conducting so that the cathode of the gating diode 34' is normally at a negative voltage to forward bias such gating diode. The same is true of the remaining gating diodes 48', 50', and 52' so that the output switching transistor 130' is normally conducting to light up the signal lamp connected to the output terminal 138' when the input signal from the pulse counter is below voltage of the lower limit reference voltage.

In order to switch the conduction of the lower limit output transistor 130', all of the gating diodes 34', 48', 50' and 52' must be rendered nonconducting to turn out the signal lamp connected to such transistor. Thus, when all of the input signals from the pulse counter stages applied to input terminals 140, 142, 144 and 146 are equal to or exceed that of the positive D.C. reference voltage (N) applied to the input terminals 148, 150, 152 and 154, all of the gating diodes 34', 48', 50' and 52' "close" to render output switching transistor 130' nonconducting and turn out the signal lamp connected at output terminal 138'. When this occurs, the unlighted condition of the output signal lamp indicates that the input signal from the pulse counter is above the lower limit reference voltage and the circuit is in a "go" condition as far as that circuit is concerned, because it is only when the signal lamp is lit that the circuit indicates a "no-go" condition. In a similar manner the coupling diodes 46', 56', 58', 84', 86' and 110' are all normally not conducting current to the gating diodes 48', 50' and 52' because the comparator transistors 36', 76', and 100' are normally turned off. When the comparator transistors 18' and 36' are rendered conducting by the input signal voltage at terminal 140 equaling the (N+1) voltage at terminal 156, the positive going voltage on the collectors of such transistors removes the negative voltage forward bias on gating diodes 34', 48', 50' and 52' so that they are all reverse biased or "closed," and output transistor 130' is immediately rendered nonconducting. However, if this input signal voltage merely equals the (N) voltage at terminal 148 without equaling the (N+1) voltage at terminal 156, only gating diode 34' is "closed" while gating diodes 48', 50' and 52' remain "open"; and the input signal voltage at terminal 142 must exceed (N) at terminal 150 to "close" diode 48' or (N+1) at terminal 158 to "close" diodes 48', 50' and 52' before output transistor 130' can be turned "off."

The operation of the no-go comparator circuits of FIGS. 1 and 2 may best be described with reference to arbitrary limit numbers of, for example, 6543 upper limit and 6521 lower limit. If the input signal from the thousands stage of the counter circuit has five stairsteps, it means that the number counted by such counter must be from 5,000 to 5,999. Since this voltage is not equal to or does not exceed the reference voltage (N) at input terminal 32 of the upper limit no-go circuit and the reference voltage (N) at input terminal 148 of the lower limit no-go circuit, the condition of the signal lamps connected to the output terminals 138 and 138' of such circuits remain the same. Thus the signal lamp of the upper limit no-go circuit is off, indicating the number is below the upper limit, and the signal lamp of the lower limit no-go circuit is on, indicating that the signal is below the lower limit number or a "no-go" condition. It should be noted that the limit reference voltages for the thousands, hundreds, tens and units stages are not the same and the term (N) used at the input terminal of these stages merely indicates a voltage corresponding to the particular digit of the limit number under consideration. However, when there are seven stairsteps in the input signal from the thousands stage of the pulse counter, the number counted by the counter must be between 7,000 and 7,999 and the voltage of the input signal is greater than or equal to the reference voltages (N) and (N+1) at input terminals 32 and 156 of the upper limit and the lower limit circuits, respectively. This causes the upper limit signal lamp to turn "on," indicating that the upper limit has been exceeded or a "no-go" condition, and allows the lower signal lamp to turn "off," indicating that the number counted is above the lower limit. Both of these circumstances correspond to a "no-go" condition in which the input signal is not between the upper and lower limits.

However, assume that the pulse counter counts a number of pulses equal to 6,532 which is between the upper limits number of 6.543 and a lower number of 6,521. When this happens, no change is made in the conduction of the gating diodes 34, 48, 50 and 52 of the upper limit circuit because none of the input signals exceeds (N) so its signal lamp remains off, indicating a "go" condition. However, the conducting condition of gating diodes 34', 48', 50' and 52' of the lower limit circuit does change by rendering such diodes nonconducting because all of the input signals are equal to or greater than (N) so the lower limit signal lamp turns off, indicating a "go" condition. Thus when the number of sampling pulses counted by the pulse counter is between the upper and lower limit numbers, both of the signal lamps be off, indicating a "go" condition. Lower limit comparator transistors 18', 60' and 88' are rendered conducting by their input signals and transmit a positive voltage pulse to reverse bias gating diodes 34', 48' and 50'. The enabling comparator transistor 100' also produces a positive going output signal which reverse biases the gating diode 52' because the input signal at terminal 144 from the tens stage of the pulse counter is equal to the reference voltage (N+1) corresponding to a number 3 which is 1 greater than the tens digit 2 of the lower limit number 6,521. It should be noted that the enabling comparator circuits of the lower limit no-go circuit do not function as they did in the upper limit no-go circuit, since their output signals merely "enable" the switching of output transistor 130. Thus the output signals from enabling comparator transistors 36', 76' and 100' are alone sufficient to "close" gating diodes 48', 50' and 52', but must be added together with the output signal from transistor 18' to switch output transistor 130'.

In a similar manner an input signal from the pulse counter corresponding to the number 6432 causes no change in the conduction of either the upper limit no-go circuit or the lower limit no-go circuit. The gating diode 48' is not "closed" because the input signal voltage corresponding to the hundreds digit 4 does not switch the enabling comparator transistors 60' and 62' since it is less than the lower limit reference voltage (N) on the base of transistor 76' corresponding to the hundreds digit 5 of the lower limit number. However, if the input signal from the pulse counter circuit corresponds to the number 6,632, the signal lamps of both the lower limit no-go circuit and the upper limit no-go circuit are changed. Since this latter number is above both of the limits, the input signals cause the lower limit signal lamp to turn "off," and the upper limit signal lamp to turn "on" indicating a "no-go" condition. The hundreds digit (6) voltage of the input signal is greater than the positive D.C. reference voltage (N) on the base of the comparator transistor 62 corresponding to the hundreds digit 5 of the upper limit number 6543, and causes the comparator transistor 60 to turn "off." This "opens" the gating diode 48 of FIG. 1 to transmit a negative output signal to the switching transistor 130 and switches it "on." The gating diode 48 had been enabled by the enabling signal transmitted through the coupling diode 46 when comparator transistor 36 switched "off" due to the fact that the input signal voltage corresponding to the thousands digit 6 is greater than the reference voltage corresponding to (N−1) or 5 on the base of comparator transistor 38. In the circuit of FIG. 2 the hundreds digit (6) voltage of the input signal on input terminal 142 is equal to the reference voltage (N+1) on the base of comparator transistor 76', so that such transistor is rendered conducting to produce a positive gating pulse which transmitted immediately through coupling diodes 84' and 86' to "close" gating diode 50' and 52'. Since gating diodes 34' and 48' had previously been "closed" by the voltage of the input signals applied to the bases of comparator transistors 20' and 62' equaling the lower limit reference voltages (N) for the thousands and hundreds digits, the base of output transistor 130' goes positive to cut off such output transistor and to turn out the lower limit signal light. Thus the no-go comparator circuits of the present invention operate with great speed and efficiency since each stage of such circuits operates consecutively so that the output signal from the thousands stage 10 and 10' switches the output transistor 130 and 130' before the output signal from the hundreds stage 12 and 12', etc., if possible.

It will be obvious that various changes may be made in the details of the preferred embodiments of the invention. For example, any number of stages may be used in the no-go comparator circuits rather than the four stages shown, and NPN type comparator transistors could be used if the voltage polarity were reversed and other obvious changes made. Therefore, it is not intended to limit the scope of the present invention to the above-described preferred embodiments thereof, but such scope should only be determined by the following claims.

I claim:

1. An electrical signal comparator circuit comprising: first comparator means for comparing a first input signal with a first limit reference signal to obtain a first output signal;

second comparator means for comparing a second input signal with a second limit reference signal to obtain a second output signal;

first gate means connected to the output of said first comparator means in order to change the conductive condition of said first gate means in response to said first output signal;

second gate means connected to the output of said second comparator means in order to change the conductive condition of said second gate means in response to said output signal;

third comparator means connected from the input of said first comparator means to the output of said second comparator means, for comparing said first input signal with a third reference signal which differs from said first reference limit signal by a predetermined amount in order to obtain a third output signal and applying said third output signal to said second gate means in order to change the conductive condition of said second gate means in response to said third output signal; and switch means connected to the output of said first gate means and said second gate means for changing the conductive condition of said switch means in response to the changes in conduction of said first gate means and said second gate means so that said comparator circuit operates sequentially in that said first input signal can cause a change in conduction of said switch means before said second input signal does so.

2. An electrical signal comparator circuit, comprising: first comparator means for comparing a first input signal with a first limit reference signal to obtain a first output signal whose polarity depends upon whether the amplitude of said first input signal is greater or less than that of said first reference signal;

second comparator means for comparing a second input signal with a second limit reference signal to obtain a second output signal whose polarity depends upon whether the amplitude of said second input signal is greater or less than that of said second reference signal;

first gate means connected to the output of said first comparator means in order to transmit said first output signal when it is of a predetermined polarity;

second gate means connected to the output of said second comparator means in order to transmit said second output signal when it is of a predetermined polarity;

enabling comparator means connected from the input of said first comparator means to the output of said second comparator means for comparing said first input signal with a third reference signal which differs from said first reference limit signal by a predetermined amount in order to obtain an enabling signal which is applied to said second gate means so that said second output signal can be transmitted through said second gate means when said enabling signal conditions said second gate means to do so; and switch means connected to said first gate means and said second gate means so that the current conducting condition of said switch means changes when either said first output signal or said second output signal is transmitted to said switch means through said first gate means or said second gate means, in order to indicate by sequential operation of said first and second gate means whether the sum total of amplitudes of said first and second input signals is greater or less than that of said first and second limit reference signals.

3. An electrical signal comparator circuit, comprising: first comparator means including a first pair of transistors, for comparing a first input signal with a first limit reference signal to obtain a first output signal whose polarity depends upon whether the amplitude of said first input signal is greater or less than that of said first reference signal;

second comparator means including a second pair of transistors, for comparing a second input signal with a second limit reference signal to obtain a second output signal whose polarity depends upon whether the amplitude of said second input signal is greater or less than that of said second reference signal;

first gate means including a first diode, connected to the output of said first comparator means in order to transmit said first output signal when it is of a predetermined polarity;

second gate means including a second diode, connected to the output of said second comparator means in order to transmit said second output signal when it is of a predetermined polarity;

enabling comparator means including a third pair of transistors, connected from the input of said first comparator means to the output of said second comparator means, for comparing said first input signal with a third reference signal which differs from said first reference limit signal by a predetermined amount in order to obtain an enabling signal which is applied to said second gate means so that said second output signal can be transmitted through said second gate means when said enabling signal conditions said second gate means to do so; and switch means including a switching transistor, connected in common to said first gate means and said second gate means so that the current conducting condition of said switch means changes when either said first output signal or said second output signal is transmitted to said switch means through said first gate means or said second gate means, in order to indicate by sequential operation of said first and second gate means whether the sum total of amplitudes of said first and second input signals is greater or less than that of said first and second limit reference signals.

4. An electrical signal comparator circuit for determining whether the signal from a counter circuit is above or below a reference limit set in said comparator circuit, comprising:

a first stage including, first comparator means for comparing a first input signal from the first stage of said counter with a first limit reference signal to obtain a first output signal, a first gate means connected to the output of said first comparator means in order to transmit said first output signal when it is of a predetermined polarity, and a first enabling comparator means connected from the input of said first comparator to the outputs of following stages for comparing said first input signal with a second reference signal that differs in amplitude from said first limit reference signal by a predetermined amount, to obtain a first enabling signal;

a plurality of intermediate stages similar to said first stage connected in succession to said first stage and to each other so that the input signals for each of said intermediate stages comes from a different stage of said counter and their limit reference signals correspond to the number limit for said different counter stage, with the gate means of each successive stage of said intermediate stages being connected to the enabling comparators of all previous stages so that the enabling signals of all of said previous stages must be applied to this gate means before it is in condition to transmit the output signal of the intermediate stage with which it is associated;

a last stage including, last comparator means for comparing a last input signal from the last stage of said counter with a last limit reference signal to obtain a last output signal, and a last gate means connected to the output of said last comparator means and to the outputs of all of the enabling comparator means of said first stage and said intermediate stages so that all of the enabling signals of said first and intermediate stages must be applied to said last gate means before it is in condition to transmit said last output signal through said last gate means; and an indicator means connected in common with all of said gate means of said first, intermediate and last stages so that the current conducting condition of said indicator means changes when any of the output signals of said stages is transmitted to said switch means through any of said gate means, in order to indicate by consecutive operation of said gate means whether the number counted by said counter is greater or less than the limit number set by the limit reference signals of said stages.

5. An electrical signal comparator circuit for determining whether the signal from a pulse counter circuit is above or below a voltage reference limit set in said comparator circuit, comprising:

a first stage including, first comparator means for comparing a first input signal from the first digit stage of said counter with a first digit limit reference voltage to obtain a first output signal, a first gate means connected to the output of said first comparator means in order to transmit said first output signal when it is of a predetermined polarity, and a first enabling comparator means connected from the input of said first comparator to the outputs of following stages for comparing said first input signal with a second reference voltage that differs in amplitude from said first digit limit reference voltage by a predetermined amount which corresponds to one digit number, to obtain a first enabling signal;

a plurality of intermediate stages similar to said first stage connected in succession to said first stage and to each other so that the input signals for each of said intermediate stages comes from a different digit stage of said counter and their digit limit reference voltages correspond to the number limit for said different counter stage, with the gate means of each successive stage of said intermediate stages being connected to the enabling comparators of all previous stages so that the enabling signals of all of said previous stages must be applied to this gate means before it is in condition to transmit the output signal of the intermediate stage with which it is associated:

a last stage including, last comparator means for comparing a last input signal from the last digit stage of said counter with a last digit limit reference voltage to obtain a last output signal, and a last gate means connected to the output of said last comparator means and to the outputs of all of the enabling comparator means of said first stage and said intermediate stages so that all of the enabling signals of said first and intermediate stages must be applied to said last gate means before it is in condition to transmit said last output signal through said last gate means; and an output switch means connected in common with all of said gate means of said first intermediate and last stages so that the current-conducting condition of said switch means changes when any of the output signals of said stages is transmitted to said switch means through any of said gate means, in order to indicate by consecutive operation of said gate means whether the number of pulses counted by said counter is greater or less than the limit number set by the digit limit reference voltages of said stages.

6. A no-go circuit for determining whether the signal from a digital pulse counter circuit is above or below a voltage reference limit set in said comparator circuit, comprising:

a first stage including a first comparator means for comparing a first input signal from the first digit stage of said counter with a first digit limit reference voltage of highest amplitude to obtain a first output signal, a first gate means connected to the output of said first comparator means in order to transmit said first output signal when it is of a predetermined polarity, a first enabling comparator means connected from the input of said first comparator to the outputs of following stages for comparing said first input signal with a second reference voltage that differs in amplitude from said first digit limit reference voltage by a predetermined amount which corresponds to one digit number to obtain a first enabling signal, and a first unidirectional coupling means connected to transmit said first enabling signal to the gate means of each of said following stages;

a plurality of intermediate stages similar to said first stage connected in succession to said first stage and to each other so that the input signals for each of said intermediate stages comes from a different consecutive digit stage of said counter and their digit limit reference voltages correspond to the number limit for said different counter stage, with the gate means of each successive stage of said intermediate stages being connected to the enabling comparators of all previous stages through their coupling means so that the enabling signals of all of said previous stages must be applied to this gate means before it is in condition to transmit the output signal of the intermediate stage with which it is associated;

a final stage including a final comparator means for comparing a last input signal from the last consecutive digit stage of said counter with a last digit limit reference voltage of lowest amplitude to obtain a last output signal, and a final gate means connected to the output of said final comparator means and to the outputs of all of the enabling comparator means of said first stage and said intermediate stages so that all of the enabling signals of said first and intermediate stages must be applied to said final gate means before it is in condition to transmit said last output signal through said final gate means; and an output switch indicator means connected in common with all the gate means of said first, said intermediate and said final stages so that the current conducting condition of said switch means changes when any of the output signals of said stages is transmitted to said switch means through any of said gate means, in order to indicate by consecutive operation of said gate means whether the number of pulses counted by said counter is greater or less than the limit number set by the digit limit reference voltages of said stages.

7. An electrical signal comparator circuit comprising:
a first pair of comparator devices each having emitter, base and collector electrodes, with their emitters connected together, with the base of one of said first pair of comparator devices connected to a source of a first input signal and the base of the other connected to a source of a first limit reference signal, and the collector of one of said first pair of comparator devices connected to ground;
a first load impedance connected to the collector of the other of said first pair of comparator devices;
a first gating device connected at its input to said first load impedance and the collector of said other of said first pair of comparator devices;
a second pair of enabling comparator devices each having emitter, base and collector electrodes, with their emitters connected together, with the base of one of said second pair of comparator devices connected to said source of said first input signal and the base of the other connected to a source of a second reference signal whose amplitude differs from that of said limit reference signal by a predetermined amount, and the collector of one of said second pairs of comparator devices connected to ground;
a second load impedance connected to the collector of the other of said second pair of comparator devices;
a second gating device connected at its input to said second load impedance and the collector of said other of said second pair of comparator devices so that an enabling signal from said second pair of comparator devices must be transmitted to said second gating device before it is in condition to transmit an output signal;
a third pair of comparator devices each having emitter, base and collector electrodes, with their emitters connected together, with the base of one of said third pair of comparator devices connected to a source of a second input signal and the base of the other connected to a source of a second limit reference signal, the collector of one of said third pair of comparator devices connected to ground, and the collector of the other of said third pair of comparator devices connected in common to said second load impedance and said input of said second gating device; and
a switching device having its input connected to the outputs of said first gating device and said second gating device so that the current conducting condition of said switching device changes when either of the output signals produced by said first pair or said third pair of comparator devices is transmitted to the input of said switching device through said first or second gating device, in order to indicate by consecutive operation of said first and second gating devices whether the sum total of amplitudes of said first and second input signals is greater or less than that of said first and second limit reference signals.

8. An electrical signal comparator circuit comprising:
a first pair of comparator transistors each having emitter, base and collector electrodes, with their emitters connected together, with the base of one of said first pair of transistors connected to a source of a first input signal and the base of the other connected to a source of a first limit reference signal, and the collector of one of said first pair of transistors connected to ground;
a first common emitter resistor connected at one end to both of the emitters of said first pair of transistors;
a first load resistor connected to the collector of the other of said first pair of transistors;
a first gating diode having anode and cathode electrodes and connected by one electrode between said first load resistor and the collector of said other of said first pair of transistors;
a second pair of enabling comparator transistors each having emitter, base and collector electrodes, with their emitters connected together, with the base of one of said second pair of transistors connected to said source of said first input signal and the base of the other connected to a source of a second reference signal whose amplitude differs from that of said limit reference signal by a predetermined amount, and the collector of one of said second pairs of transistors connected to ground;
a second common emitter resistor connected at one end to both of the emitters of said second pair of transistors;
a second load resistor connected to the collector of the other of said second pair of transistors;
a second gating diode connected by one electrode between said second load resistor and the collector of said second pair of transistors so that an enabling signal from said second pair of transistors must be transmitted to said gating diode having anode and cathode electrodes and before it is in condition to transmit an output signal;
a third pair of comparator transistors each having emitter, base and collector electrodes, with their emitters connected together, with the base of one of said third pair of transistors connected to a source of a second input signal and the base of the other connected to a source of a second limit reference signal, the collector of one of said third pair of transistors connected to ground, and the collector of the other of said third pair of transistors connected in common to said second load resistor and said one electrode of said second gating diode;
a third common emitter resistor connected at one end to both of the emitters of said third pair of transistors; and
a switching transistor having emitter, base and collector electrodes and connected by its base to the other electrodes of said first gating diode and said second gating diode so that the current conducting condition of said switching transistor changes when either of the output signals produced by said first pair of said third pair of comparator transistors is transmitted to the base of said switching transistor through said first or second gating diode in order to indicate by consecutive operation of said first and second gating diodes whether the sum total of amplitudes of said first and second input signals is greater or less than that of said first and second limit reference signals.

9. A no-go circuit comprising:
a first pair of PNP-type comparator transistors each having emitter, base and collector electrodes, with their emitters connected together, with the base of one of said first pair of transistors connected to a source of a first input signal and the base of the other connected to a source of a first limit reference signal, and the collector of one of said first pair of transistors connected to ground;
a first common emitter resistor connected at one end to both of the emitters of said first pair of transistors;
a first load resistor connected to the collector of the other of said first pair of transistors;
a first gating diode having anode and cathode electrodes and connected by its cathode between said first load resistor and the collector of said other of said first pair of transistors;
a second pair of PNP-type enabling comparator transistors each having emitter, base and collector electrodes, with their emitters connected together, with the base of each of said second pair of transistors adapted to be connected to said source of said first input signal and the base of the other connected to a source of a second reference signal whose amplitude differs from that of said limit reference signal by a predetermined amount, and the collector of one of said second pairs of transistors connected to ground;

a second common emitter resistor connected at one end to both of the emitters of said second pair of transistors;

a second load resistor connected to the collector of the other of said second pair of transistors;

a coupling diode having anode and cathode electrodes and having emitter, base and collector electrodes and connected at its anode to the collector of said other of said second pair of transistors and at its cathode to said second load resistor;

a second gating diode having anode and cathode electrodes and connected by its cathode between said second load resistor and the collector of said second pair of transistors so that an enabling signal from said second pair of transistors must be transmitted to said gating diode before it is in condition to transmit an output signal;

a third pair of PNP-type comparator transistors each having emitter, base and collector electrodes, with their emitters connected together, with the base of one of said third pair of transistors connected to a source of a second input signal and the base of the other connected to a source of a second limit reference signal, the collector of one of said third pair of transistors connected to ground, and the collector of the other of said third pair of transistors connected in common to said second load resistor and said cathode of said second gating diode;

a third common emitter resistor connected at one end to both of the emitters of said third pair of transistors; and a PNP-type switching transistor having emitter, base and collector electrodes and connected by its base to the anodes of said first gating diode and said second gating diode so that the current conducting condition of said switching transistor changes when either of the output signals produced by said first pair of said third pair of comparator transistors is transmitted to the base of said switching transistor through said first or second gating diode in order to indicate by consecutive operation of said first and second gating diodes whether the sum total of amplitudes of said first and second input signals is greater or less than that of said first and second limit reference signals.

No references cited.

UNITED STATES PATENT OFFICE
CERTIFICATE OF CORRECTION

Patent No. 3,153,734                          October 20, 1964

Samuel R. McCutcheon

It is hereby certified that error appears in the above numbered patent requiring correction and that the said Letters Patent should read as corrected below.

In the heading to the drawings, lines 2 and 3, and in the heading to the printed specification, lines 2 to 4, title of invention, for "COMPARATOR CIRCUITS FOR DETERMINING WHEN A NUMBER IS GREATER THAN A PREDETERMINED NUMBER", each occurrence, read -- COMPARATOR CIRCUITS FOR DETERMINING WHEN A NUMBER IS GREATER OR LESS THAN A PREDETERMINED NUMBER --; column 2, line 39, after "to" insert -- provide --; column 5, lines 73 to 75, strike out "a load resistor 128. The output signal of the units stage is transmitted from the collector of the comparator transistor 114 through"; column 7, line 70, for "6.543" read -- 6,543 --; column 8, line 8, after "lamps" insert -- will --; column 9, line 27, after "said" insert -- second --; column 15, line 9, strike out "having emitter, base and collector electrodes and".

Signed and sealed this 6th day of April 1965.

(SEAL)
Attest:

ERNEST W. SWIDER
Attesting Officer

EDWARD J. BRENNER
                                               Commissioner of Patents